Figure 1:
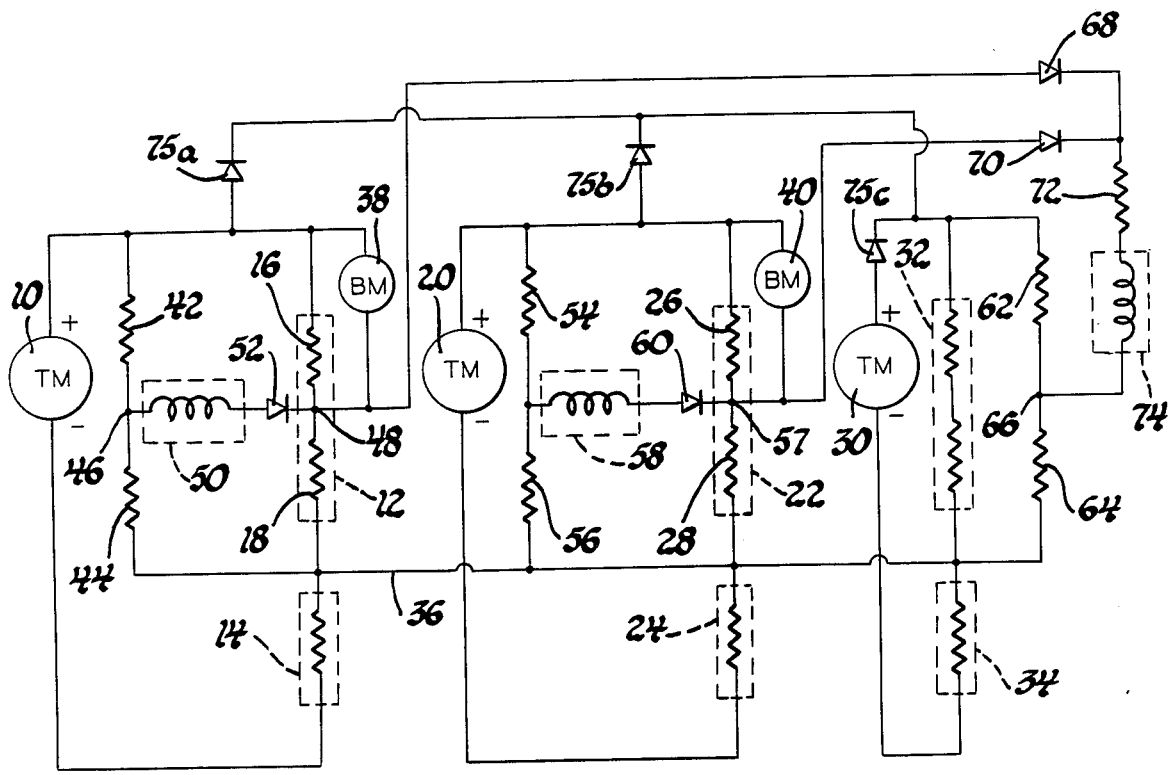

United States Patent [19]

Chen

[11] 4,203,058

[45] May 13, 1980

[54] FAILURE DETECTION CIRCUIT FOR DYNAMIC BRAKING SYSTEM

[75] Inventor: Stephen S. Chen, Downers Grove, Ill.

[73] Assignee: General Motors Corporation, Detroit, Mich.

[21] Appl. No.: 936,781

[22] Filed: Aug. 25, 1978

[51] Int. Cl.² ............... H02H 3/04; H02H 3/08; H02H 3/12
[52] U.S. Cl. ..................... 318/380; 340/648; 361/33; 361/86; 361/89
[58] Field of Search ............ 318/103, 104, 375, 379, 318/380, 449, 450, 471, 472, 473; 361/23, 33, 86, 88, 89; 340/599, 648

[56] References Cited

U.S. PATENT DOCUMENTS

| | | | |
|---|---|---|---|
| 3,660,813 | 4/1972 | Rumpf | 340/52 R |
| 4,048,664 | 9/1977 | Kirilloff | 361/89 |

Primary Examiner—Gene Z. Rubinson
Assistant Examiner—Forester W. Isen
Attorney, Agent, or Firm—Warren D. Hill

[57] ABSTRACT

A diesel electric locomotive has a dynamic braking system including a plurality of traction motors connected across dynamic braking grids. Air blowers for cooling the grids have motors which are connected across the grids. The failure of any motor is detected by monitoring the voltage across the motor with respect to a reference potential. The reference potential is developed in a bridge arrangement wherein the bridge imbalance is detected by a current sensor or by a reference potential generated in another motor circuit where another current sensor is used to detect a variance from the reference value. A circuit responsive to failure signals but voltage isolated from the traction motor circuits actuates an indicator as well as a relay for diminishing or terminating the dynamic braking function.

4 Claims, 2 Drawing Figures

FAILURE DETECTION CIRCUIT FOR DYNAMIC BRAKING SYSTEM

This invention relates to motor failure detection and particularly to control circuits for detecting the failure of blower motors for dynamic braking grids. Diesel electric locomotives commonly supplement their mechanical braking system with dynamic braking. Such locomotives have traction motors fed from a locomotive generator during motoring operation. The traction motors, in turn, drive the locomotive wheels. During braking, however, the wheels drive the traction motors which then generate electricity. When entering the braking mode, the motor armatures are switched from the generator circuit to a dynamic braking circuit wherein the traction motors are each arranged in series with dynamic braking grids or resistors for dissipating energy developed by traction motors when they are being driven by the locomotive wheels. The grids which are arranged in a common compartment are subject to burning out if their temperature is allowed to increase beyond a safe limit. Consequently, air is circulated by blowers in the compartment. The blowers are operated by electrical motors connected to the grids so that the motors will be actuated whenever the grids are energized by current from the traction motors. The blower motors in turn are subject to failure by either an open circuit or shorting out, in which case, the dynamic braking grids will be in danger of overheating. Consequently, it is desired to provide a circuit for detection of a blower motor failure. While it has been proposed to compare the current to one blower motor to that of another, the comparison cannot be relied upon to provide a failure detection when both motors open or short out at the same time. Further, that technique is not useful when only one blower motor is used in the system.

It is, therefore, a general object of this invention to provide a circuit to detect the failure of a blower motor in a dynamic braking system independently of any other blower motor. It is a further object in such a system to detect failure of a blower motor whether the failure is due to an open circuit condition or a shorted circuit in the blower motor.

The invention is carried out by providing a bridge circuit for detecting an open circuit condition wherein the bridge comprises a pair of grid resistors in parallel with a pair of reference resistors and where the blower motor is across one grid resistor, a bridge imbalance detector is located across the bridge, and a short circuit condition of the blower motor is detected by providing a reference potential from an independent source and providing a current sensor for detecting a variance of the blower motor potential from the reference potential.

Figure 2:
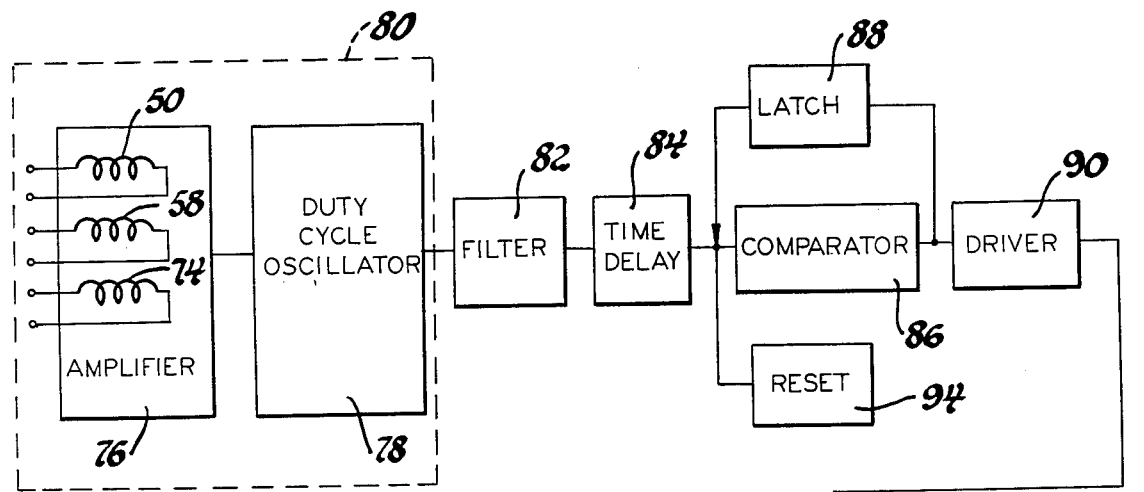

The above and other advantages will be made more apparent from the following specification taken in conjunction with the accompanying drawings wherein like reference numerals refer to like parts and wherein:

FIG. 1 illustrates a dynamic braking system with blower motors and circuitry including current sensors for detecting motor failure, and FIG. 2 is a control circuit responsive to the current sensors for indicating a blower motor failure and taking corrective action.

FIG. 1 shows three locomotive traction motors arranged in independent circuits for dynamic braking. Preferably, when generating current, the motors are controlled to substantially the same voltage by means, not shown, for regulating the field current of the motors. The top side of the motors, as shown in the drawing, in positive. Traction motor 10 is connected in series with grids dynamic braking 12 and 14 wherein the grid 12 comprises two resistor sections 16 and 18 which are of approximately equal resistances. Traction motor 20 is connected in series with dynamic braking grids 22 and 24. The grid 22 comprises a pair of substantially equal resistances 26 and 28. Traction motor 30 is connected in series with dynamic braking grids 32 and 34. Each pair of grids 12, 14 and 22, 24 and 32, 34 are connected at their junctions to a common tie line 36. The several dynamic braking grids are located in a common compartment and cooled by two air circulating blowers which are operated by blower motors 38 and 40 of the DC inductive type having a series field. The blower motor 38 is connected in parallel with the resistor 16 and the blower motor 40 is connected in parallel with the resistor 26 so that the blowers are automatically actuated when the grids are energized by current flow from the traction motors 10 and 20. A pair of substantially equal resistors 42 and 44 are serially connected across the grid 12 so that the junction point 46 of those resistors is at substantially the same potential as the junction point 48 of the resistors 16 and 18 during normal dynamic braking operation. A current sensing coil 50 in series with a diode 52 is connected between the junction point 46 and the junction point 48 with the diode poled to allow current conduction only when the potential at point 46 exceeds that of point 48. The specific values of the resistors 16, 18, 42 and 44, which are arranged in a bridge, are selected to assure bridge balance and no current flow to the current detector 50 when the blower motor 38 is functioning properly in its steady state condition.

The blower motors are sometimes subject to an open circuit condition due to an open current supply cable, loose terminal connection, a faulty brush or an open field winding. When the blower motor experiences an open circuit or partial open circuit condition, the potential at point 48 becomes lower than normal since the net resistance of the parallel resistor-blower motor combination increases so that current flows through the current detector 50 and the diode 52. To detect an open circuit condition in the blower motor 40, a circuit arrangement just like that described for the blower motor 38 is provided. that is, a pair of reference resistors 54 and 56 joined at a junction point 57 are arranged across the grid 22 to provide a bridge configuration while a current sensing coil 58 and a diode 60 are arranged across the bridge to detect bridge imbalance upon open circuiting of the blower motor 40.

In the circuit connected to the traction motor 30 a pair of reference resistors 62 and 64 are serially connected across the grid 32. The junction point 66 of those reference resistors provides a reference potential independent of the operation of the blower motors 38 and 40. Each of the traction motors, however, are regulated in their output so as to produce substantially equal voltages when the motor speeds are equal. Thus, during normal braking operation the voltage of reference point 66 will be substantially equal to the voltage of junction points 48 nd 57. Those junction points 48 and 57 are each connected through diodes 68 and 70, respectively, a resistor 72, and a current detector coil 74 to the junction point 66. The diode 68 and 70 are poled to conduct whenever the voltage at the midpoint of the junction points 48 and 57 increases to a value somewhat above that of the reference point 66. During dynamic braking opertion a short circuit condition or even a partial short of blower motor 38 or 40 will cause the potential rise at the reference point 48 or 57 to cause current flow through the current detector coil 74. A short circuit condition occurs in a blower motor when there is a shorted field winding or a short occurs external to the motor. A further short condition or apparent short condition arises when the motor is stalled by a motor bearing freeze-up or some interference with blower rotation.

To safeguard against lowering of voltage at reference point 66 in the event of wheel slippage and loss of speed of traction motor 30, three diodes 75a, 75b and 75c are employed to connect the positive terminals of traction motors 10, 20 and 30 respectively to the upper side of the resistor 62. Then if wheel slip occurs the highest traction motor voltage is available to energize the voltage divider 62, 64 to derive a reliable reference voltage at junction 66.

FIG. 2 comprises a control circuit sensitive to current flow in any of the current detectors of FIG. 1. A voltage isolation amplifier 76 is responsive to the currents flowing in the coils 50, 58 and 74 and, in fact, includes those coils as a part thereof and produces an output proportional to the sum of the currents flowing in those coils. A duty cycle oscillator 78 responsive to the output of the amplifier 76 provides a series of output pulses having a duty cycle which varies in accordance with the sum of the current in the coils 50, 58 and 74. The amplifier and duty cycle oscillator in combination form a unit 80 which preferably comprises a Magsense comparator connected to operate as a duty cycle oscillator. An appropriate device is the Magsense comparator model 70 produced by Pioneer/Instrumentation Division of Pioneer-Standard Electronics, Inc. The pulse output of the comparator 80 is fed in series to a filter 82, a time delay circuit 84, a comparator or level detector 86 which is latched on by latch 88 once it turns on, a driver 90 and an indicator and relay output 92. A manual reset 94 is provided to overcome the latching condition.

In operation the filter 82 produces a DC output corresponding to the duty cycle of the pulse train from the comparator 80. The time delay 84 prevents immediate circuit response to sudden increases of signal level thereby making the circuit insensitive to transients. As a consequence, there is no false trip due to a voltage surge occuring when the blower motor is started at a high grid current level. The comparator 86 detects the level of the signal passed by the time delay circuit relative to a preset reference potential. With zero current input to the amplifier 76, the duty cycle oscillator does provide a pulse output as a predetermined pulse width so that a nominal DC level is fed to the comparator. The reference voltage of threshold value for the comparator then is set to be slightly higher than the nominal level for zero input current. When the DC signal does rise above the reference value, the comparator 86 produces an output which is latched on until manually reset. The driver 90 then drives an indicator such as a warning lamp and simultaneously operates a relay which is effective to diminish the traction motor current to a level for safe operation during impaired blower functioning or terminates the dynamic braking effort altogether. In the event the driver 90 operates a relay to terminate the dynamic braking, the voltage imbalance in the grids will disappear. The latch keeps the driver 90 on until the circuit is manually reset to prevent cycling between braking on and off modes and to maintain a malfunction indication.

It will thus be seen that according to the present invention the failure of either blower motor circuit is monitored regardless of whether the failure results in an open circuit or a short circuit and regardless of whether more than one blower motor fails at the same time.

The embodiments of the invention in which an exclusive property or privilege is claimed are defined as follows:

1. In a dynamic braking system for a vehicle having first and second traction motors controlled to substantially the same nominal voltages and connectable in series with first and second dynamic braking grids, respectively, the first dynamic braking grid including two series resistors connected at a first junction, and a blower motor connected across one of the resistors of the first grid for driving a blower to cool the grids when current is applied to the said first grid, a control circuit for detecting failure of the blower motor comprising a first pair of reference resistors serially connected across the two first grid resistors to form a bridge circuit therewith, first sensor means connected across said bridge circuit to detect a first signal developed due to bridge imbalance only when the blower motor experiences an open circuit condition, a second pair of reference resistors joined at a second junction and connected across the second grid to provide a reference potential at the second junction, second sensor means connected between the said first and second junctions to detect a second signal that is developed between said junctions only when the blower motor experiences a short circuit condition, and a detector circuit responsive to the first and second signals for generating a control signal when either type of motor failure occurs.

2. In a dynamic braking system for a vehicle having first, second and third traction motors controlled to substantially the same nominal voltages and each connectable in series with first, second and third dynamic braking grids, respectively, first and second dynamic braking grids each including two series resistors connected at a first and second junctions, respectively, and a blower motor connected across one of the resistors of each of the first and second grids for driving a blower to cool the grids when current is applied thereto, a control circuit for detecting failure of the blower motors comprising a first pair of reference resistors serially connected across the first grid resistors to form a first bridge circuit therewith, first sensor means connected across said first bridge circuit to detect a first signal due to bridge imbalance only when the blower motor connected to said first grid experiences an open circuit condition, a second pair of reference resistors serially connected across the two second grid resistors to form a second bridge circuit therewith, second sensor means connected across said second bridge to detect a second signal due to bridge imbalance only when the blower motor connected to said second grid experiences an open circuit condition, a third pair of reference resistors joined at a third junction and connected across the third grid to provide a reference potential at the third junction, third sensor means connected to said third junction, circuit means connecting said first and second junction through the third sensor means to the third junction for detecting a third signal that is developed between the first and third junctions or between the second and third junctions only when a blower motor experiences a short circuit condition, and a detector circuit responsive to the first, second and third signals for generating a control signal when either type of motor failure occurs in either motor.

3. In a dynamic braking system for a vehicle having first and second traction motors controlled to substantially the same nominal voltages and connectable in series with first and second dynamic braking grids, respectively, the first dynamic braking grid including two series resistors connected at a first junction, and a blower motor connected across one of the resistors of the first grid for driving a blower to cool the grids when current is applied to the said first grid, a control circuit for detecting failure of the blower motor comprising a first pair of reference resistors serially connected across the two first grid resistors to form a bridge circuit therewith, a first current sensor coil in series with a diode and connected across said bridge circuit to detect a first signal developed due to bridge imbalance only when the blower motor experiences an open circuit condition, a second pair of reference resistors joined at a second junction and connected across the second grid to provide a reference potential at the second junction, a second current sensor coil in series with a diode and connected between the said first and second junctions to detect a second signal that is developed between said junction only when the blower motor experiences a short circuit condition, and a detector circuit having an isolating amplifier incorporating the said current sensor coils and responsive to the first and second signals for generating a control signal when either type of motor failure occurs.

4. In a dynamic braking system for a vehicle having first and second traction motors controlled to substantially the same nominal voltages and connectable in series with first and second dynamic braking grids, respectively, the first dynamic braking grid including two series resistors connected at a first junction, and a blower motor connected across one of the resistors of the first grid for driving a blower to cool the grids when current is applied to the said first grid, a control circuit for detecting failure of the blower motor comprising a first pair of reference resistors serially connected across the two first grid resistors to form a bridge circuit therewith, a first current sensor coil in series with a diode and connected across said bridge circuit to detect a first current signal developed due to bridge imbalance only when the blower motor experiences an open circuit condition, a second pair of reference resistors joined at a second junction and connected across the second grid to provide a reference potential at the second junction, a second current sensor coil in series with a diode and connected between the said first and second junctions to detect a second current signal that is developed between said junction only when the blower motor experiences a short circuit condition, and a detector circuit comprising an isolating amplifier incorporating the said current sensor coils and responsive to the first and second current signals for generating a variable signal dependent on the sum of the current signals, means responsive to the variable signal for producing a pulse output having a duty-cycle dependent on the variable signals, means for filtering the pulse signal to provide a DC signal, a time delay circuit receiving the output of the filtering means to prevent response of the detector circuit to transient signals, and a level detector means responsive to the time-delayed DC signal for generating a control signal when the DC signal exceeds a threshold value indicative of motor failure.

* * * * *